United States Patent [19]
Wilkerson

[11] Patent Number: 5,515,813
[45] Date of Patent: May 14, 1996

[54] AQUATIC CULTIVATOR

[76] Inventor: Douglas D. Wilkerson, P.O. Box 623, Larkspur, Calif. 94977-0623

[21] Appl. No.: 240,013

[22] Filed: May 9, 1994

[51] Int. Cl.$^6$ .................................................. A01K 61/00
[52] U.S. Cl. .......................................... 119/223; 119/237
[58] Field of Search .................................. 119/208, 209, 119/223, 237, 239, 240

[56]  References Cited

U.S. PATENT DOCUMENTS

| 2,989,945 | 6/1961 | Ford | 119/239 |
| 3,675,626 | 7/1972 | Down | 119/237 |
| 3,702,599 | 11/1972 | Herolzer | 119/240 |
| 3,741,159 | 6/1973 | Halaunbrenner | 119/239 |
| 3,853,095 | 12/1974 | Lawrence | 119/237 |
| 3,870,019 | 3/1975 | McNicol | 119/240 |
| 4,182,270 | 1/1980 | Fourcher | 119/237 |
| 4,377,987 | 3/1983 | Satre | 119/240 |
| 4,395,970 | 8/1983 | Kunkle et al. | 119/239 |
| 4,766,846 | 8/1988 | Lavoie | 119/239 |

FOREIGN PATENT DOCUMENTS

| 2109062 | 5/1972 | France | 119/237 |
| 826998 | 5/1981 | U.S.S.R. | 119/237 |

OTHER PUBLICATIONS

Pacific Seafood Industries, Inc. Sales Brochure pp. 1, 2, and 7.
Cia. de Mallas y Plasticos LTDA. Advertisement Aquanoticias International, p. 60, 1993.
WilliamShaw, Abalone Farm In Northern California, 1991, pp. 92–97.
Abalone Grown On Longlines, World Aquaculture 1992, pp. 60–61.
Handbook Of Culture Of Abalone And Othe Marine Gastropods, Kirk O. Hahn, 1989, pp. 233, 234, 259, 261.

Primary Examiner—Robert P. Swiatek

[57] ABSTRACT

An aquatic cultivator (12) suitable for culturing aquatic invertebrates, fishes, and the like requiring broad surfaces for attachment, comprising a base (26), a hub (28), and a plurality of partitions (24). The base (26) contains a plurality of cutouts (36). A socket (34) and post (30), arranged on opposite ends of the hub (28), provide a mortise-and-tenon-like connection for assembling a plurality of aquatic cultivators (12). The aquatic cultivator (12) is contained within a porous container (14) which has openings (38) to permit culturing activities within. A tether (20) with a knot (22) secures the aquatic cultivator (12) to a float and/or anchor at a desired position within the water.

4 Claims, 2 Drawing Sheets

AQUATIC CULTIVATOR

FIELD OF INVENTION

This invention relates to the field of mariculture, and more particularly, to the field of growing aquatic invertebrates, fishes, and the like requiring broad surfaces for attachment, or adherence.

DESCRIPTION OF PRIOR ART

It is known that some aquatic invertebrates, fishes, and the like, require broad surfaces to which they attach, and on which they can move during their feeding and growth, in order to be successfully cultivated. For this purpose various habitats, cages, baskets, and the like, have been invented to provide such surface areas for cultivation purposes. It is known from the prior art that, in addition to providing relatively broad surfaces, such cultivators must be constructed to provide convenient means of placing, feeding, culling, grading, and harvesting the aquatic life, contained therein. In addition, the cultivator must provide an efficient use of the water column, wherein it is suspended, by providing an optimal amount of surface area to the volume of water column occupied. Finally, the cultivator should be convenient to handle and maintain, modular to allow versatility for different applications, relatively easy to manufacture, and of relative low cost.

Hitherto, cultivators devised for aquatic invertebrates, fishes, and the like, requiring surfaces for attachment, have had one or more of the above desired elements in their construction, but none employ all of the elements, which in combination provide the greatest advantage for commercial success.

U.S. Pat. Nos. 4,766,846 (1988) to Jean-Pierre Lavoie, 4,377,987 (1983) to Alf R. Satre, 3,870,019 (1975) to Douglas McNicol, 3,741,159 (1973) to Lazare Nathan Halaunbrenner, and 3,702,566 (1972) to Ralph H. Herolzer, were directed at shellfish cultivation, especially oysters, clams, scallops, and the like. Their designs, while providing modular construction and generally efficient use of the water column, do not provide for relatively broad surfaces for attachment purposes. Additionally, each requires a degree of disassembly, which is less than convenient, to perform certain culturing tasks upon the shellfish contained therein.

U.S. Pat. Nos. 4,395,970 (1983) to Kunkle et al., 4,182,270 (1980) to Fredrick J. Fourcher, and 2,989,945 (1961) to Edwin H. Ford describe habitats that can provide broad surface areas for attachment purposes. Unfortunately, the teachings of each of these patents provides for relatively elaborate construction means. In addition, the teachings of U.S. Pat. Nos. 4,395,970 (Kunkle et al.) and 4,182,270 (Fredrick J. Fourcher) require disassembly or removal of some parts in order to perform certain culturing tasks such as grading, culling, and harvesting.

U.S. Pat. No. 3,675,626 (1972) to Russel J. Down describes a plurality of annular tings vertically suspended. The teachings of this patent provide for modular assembly and relatively easy, low cost manufacture, however, there is a less than desirous efficient use of the water column.

Other devices such as barrels, rafts containing cages, and plastic culture baskets, used for cultivating aquatic life requiring surfaces for attachment, have limited advantages. Barrels used in cultivation have broad interior surfaces, but are very inefficient in their use of the water column. In addition, barrels do not easily lend themselves to modular configurations without compromising their handling and maintenance values. Rafts containing cages require relatively elaborate construction, as well as, substantial amounts of maintenance. Plastic culture baskets, such as those used to culture abalone in Korea, provide broad surface areas through a plurality of horizontally oriented plates. However, there is an inefficient use of the water column as the surface area available for attachment purposes is restricted to the plates and a small lip on the peripheral edge of the plates. Additionally, the plates are constructed in multiple pieces, thereby decreasing the ease of manufacture and making their ease of handling less than desirous.

In addition to reviewing existing patents, I have researched eight leading mariculture magazine publications with no evidence of any cultivator for aquatic invertebrates, fishes, and the like, requiring surfaces for attachment, having all of the aforementioned elements in combination.

OBJECTS AND ADVANTAGES

Accordingly, several objects and advantages of my invention are:

(a) to provide a cultivator with relatively broad surfaces to which aquatic invertebrates, fishes, and the like, can attach and on which they can move during their feeding and growth.

(b) to provide a cultivator constructed in such a way to provide convenient means of placing, feeding, culling, grading, and harvesting the aquatic invertebrates, fishes, and the like, contained thereon.

(c) to provide a cultivator which provides an efficient use of the water column, wherein it is suspended, by providing an optimal amount of surface area to the volume of water occupied.

(d) to provide a cultivator which is convenient to handle and maintain.

(e) to provide a cultivator which is modular to allow versatility for different applications, relatively easy to manufacture, and of relative low cost.

Further objects and advantages of my invention will become apparent from a consideration of the drawings and ensuing description.

DRAWING FIGURES

DRAWING REFERENCE NUMERALS

| | |
|---|---|
| 10 | aquatic habitat |
| 12, 12a, 12b | aquatic cultivator |
| 14 | container |
| 16 | apertures |
| 18 | strands |
| 20 | tether |
| 22 | knot |
| 24 | partitions |
| 26 | base |
| 28 | hub |
| 30 | post |
| 32 | bore |
| 34 | socket |
| 36 | cutouts |
| 38 | opening |
| 40 | frame |
| 42 | loop fasteners |
| 44 | door |
| 46 | hook and loop fastener |

SUMMARY

The cultivating device according to this invention includes a base with broad, oppositely directed faces, a hub centrally positioned and extending outwardly from the base, and a plurality of partitions having broad, oppositely directed faces extending radially from the hub, as well as outwardly from the base, whereby broad surfaces are provided for invertebrates, fishes, and the like, to which they attach and move on.

DESCRIPTION

Figure 1:
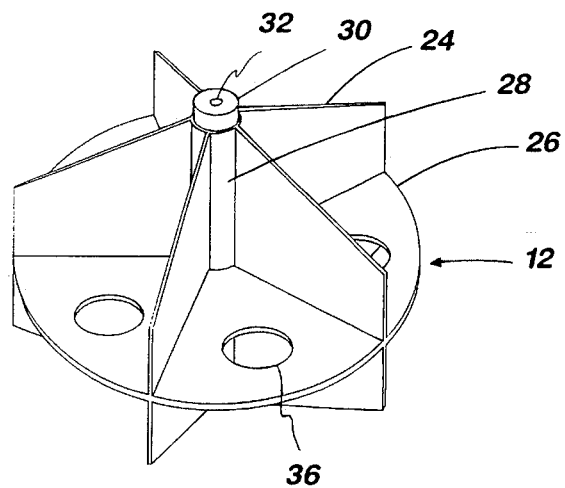
FIG. 1 is a perspective top view of an aquatic cultivator according to a preferred embodiment of this invention.
Figure 2:
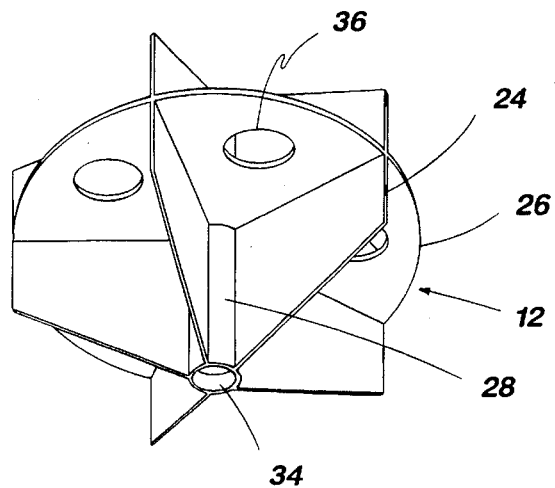
FIG. 2 is a perspective bottom view of the aquatic cultivator in FIG. 1.

FIGS. 1 and 2, show perspective views of a typical embodiment of an aquatic cultivator 12 of the present invention. Aquatic cultivator 12 consists of a base 26, a hub 28, and a plurality of dividers, panels, or partitions 24. In accordance with the preferred embodiment, all parts of aquatic cultivator 12 can be integrally produced from plastics or synthetic materials, using injection-moulding or moulding by other techniques. For example, acrylonitrile-butadiene-styrene, polyethylene, polypropylene, polyvinylchloride, polyamide, thermosetting materials, or urea/formol resins can be used, although this list and the described construction methods are in no way intended to be limitative of the scope of this invention.

Base 26 has broad oppositely directed faces or surfaces, and contains a plurality of holes or cutouts 36. Although base 26 and cutouts 36 can be constructed in various shapes, in the embodiment illustrated, they are circular. Cutouts 36 are positioned between partitions 24.

Figure 3:
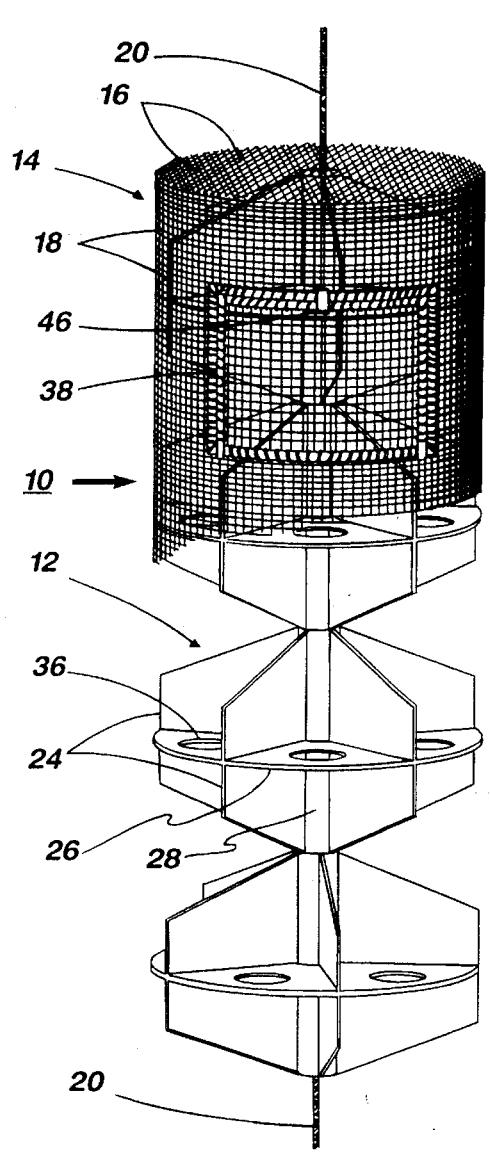
FIG. 3 is a perspective view, with portions of the container removed, of an aquatic habitat constructed in accordance with the teachings of this invention.
Figure 4:
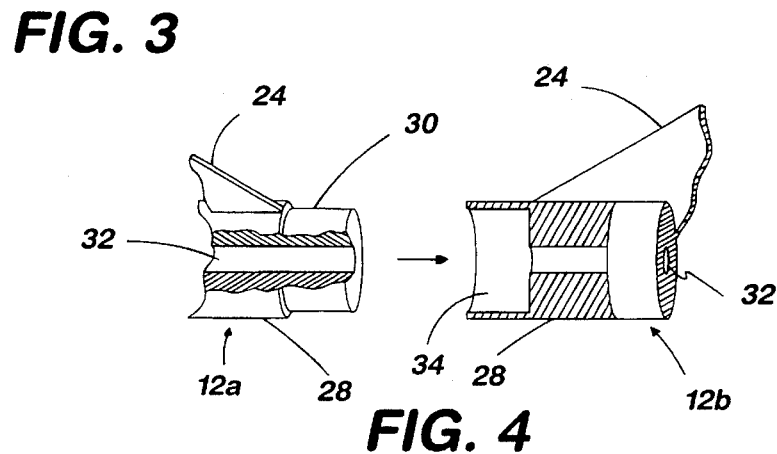
FIG. 4 is a fragmentary perspective view, with portions of the hubs removed, of a typical means to connect two or more aquatic cultivators together.
Figure 7:
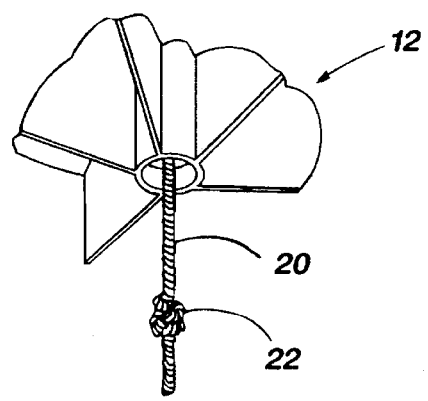
FIG. 7 is a perspective view illustrating a typical means to position an aquatic cultivator on a tether.

As shown in FIGS. 2 and 3, hub 28 is centrally located on base 26. Hub 28 is tubular and extends perpendicularly outward from one face of base 26 to end in a post 30 (FIG. 2). On the opposing face of base 26, tubular hub 28 extends perpendicularly outward to end in a socket 34 (FIG. 3). The arrangement of post 30 and socket 34 allows for the coupling or connection of multiple aquatic cultivators 12. As shown in FIG. 4, this coupling is accomplished by having post 30 and socket 34 shaped to provide a mortise- and-tenon type connection between aquatic cultivators 12a and 12b. Positioned in the center of hub 28 is a bore 32. Bore 32 extends axially through the entire length of hub 28, from the face of post 30 to the face of socket 34. The size of bore 32 is sufficient to allow a tether, line, or cable 20 to pass through its entire length. FIG. 7 shows one means of positioning aquatic cultivator 12 on tether 20 using a knot 22. To accomplish this, knot 22 is made sufficiently large as to not pass through bore 32 thereby allowing aquatic cultivator 12 to rest on knot 22 in the desired position.

Partition 24 has broad oppositely directed faces or surfaces extending radially from hub 28 to the peripheral edge of base 26 and perpendicularly outward from the face of base 26. In accordance with the preferred embodiment, partition 24 is shaped so that the outward projection along hub 28 extends to post 30 and socket 34 on their respective ends of hub 28. At the peripheral edge of base 26 partition 24 extends outwardly less than along hub 28 As can be seen by FIGS. 2 and 3, the placement of the plurality of partitions 24 on the oppositely directed faces of base 26 is symmetrical, using the plane between the two faces of base 26 as the point of symmetry.

FIG. 3 shows a perspective view of a typical embodiment of an aquatic habitat 10 utilizing the present invention. Aquatic habitat 10 includes a container 14 and plurality of aquatic cultivators 12 within the container. Container 14 is porous. Although container 14 may be of various different constructions, in the embodiment illustrated it is constructed of plastic netting. The netting includes a plurality of strands 18 suitably attached and spaced apart to define a plurality of apertures 16 which permit water to enter and leave container 14. Container 14 may have one or more openings 38.

Figure 5:
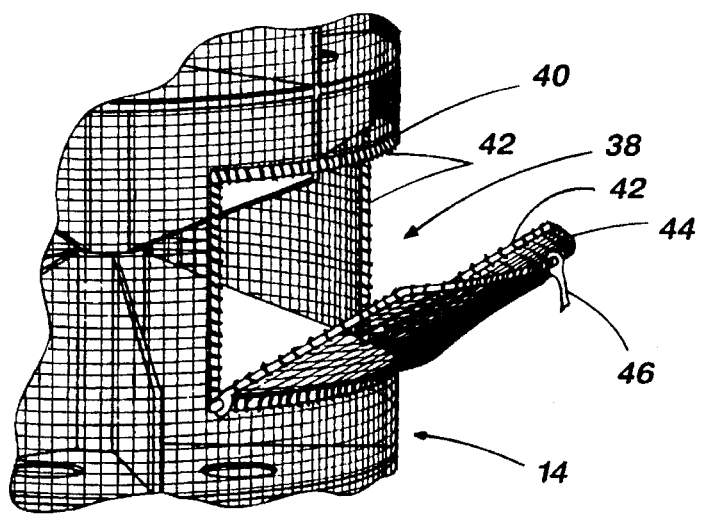
FIG. 5 is a fragmentary perspective view of an opening, comprised of a door and a frame, in the container.
Figure 6:
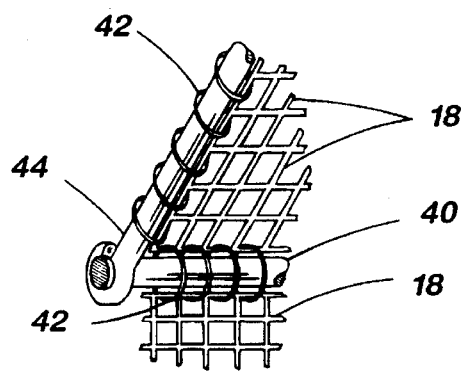
FIG. 6 is a fragmentary perspective view showing a typical means of attaching the door to the frame of the opening.

As shown in FIG. 5, opening 38 preferably is made of a four-sided frame 40 and a door 44, both of which can be constructed of corrosion resistant materials, such as plastic or stainless steel. Frame 40 is generally formed in the shape of the contours of the area of container 14 where it is to be placed, and is positioned and attached to container 14 by loop fasteners 42. Although loop fasteners 42 may be of various constructions, in the embodiment illustrated, plastic tie wraps are used. Door 44 is shaped similarly to frame 40, but having only three sides. Netting, having apertures 16 and strands 18, is attached to the three sides of door 44 by loop fasteners 42. Using loop fasteners 42, the fourth side of the plastic netting on door 44 is attached to frame 40. As shown in FIGS. 5 and 6, the two opposing sides of door 44 are attached to frame 40 on the same side of frame 40 as the netting of door 44 is attached. Although door 44 can attach to frame 40 by various means, in the embodiment illustrated, the two opposing sides of door 44 are bent around frame 40, thereby forming an eye through which frame 40 extends and on which door 44 pivots. When opening 38 is in the closed position, door 44 is held securely against frame 40 by a hook and loop fastener 46. To accomplish this, fastener 46, attached to door 44, is passed around frame 40, through aperture 16, and reattached to itself.

OPERATION

FIG. 3 illustrates a typical operation of aquatic cultivator 12. The base 26 and plurality of partitions 24 provide broad surface areas to which the aquatic invertebrates, fishes, and the like, attach and move on. Additionally, these broad surfaces provide for convenient placement and removal of the aquatic invertebrates, fishes, and the like. Cutouts 36 allow the aquatic life, as well as water, to move throughout aquatic habitat 10. The integral construction of aquatic cultivator 12 provides for ease of maintenance and handling. Openings 38 are placed on container 14 to provide access to all aquatic cultivators 12 within. A plurality of aquatic cultivators 12 is easily assembled using the mortise-and-tenon style connection of post 30 and socket 34. Using bore 32, tether 20 is passed through each aquatic cultivator 12 and used to position or secure aquatic habitat 10 to suitable anchoring and/or floatation devices (not shown). Using knot 22 as a positioning or securing means on aquatic cultivator 12, aquatic habitat 10 is fixed at a desired depth within the water.

SUMMARY, RAMIFICATIONS, AND SCOPE

Accordingly, the reader will see that the aquatic cultivator of this invention employs the desired elements necessary to successfully cultivate aquatic invertebrates, fishes, and the like, requiring broad surfaces for attachment, by providing large amounts of broad surface area using the base and partitions, while efficiently utilizing the water column;

providing convenient means to perform culturing tasks without disassembly or removal of any parts by use of the broad surface areas of the base and partitions;

providing easy assembly of multiple aquatic cultivators using the mortise-and-tenon style connection, as well as, versatility by allowing any number of aquatic cultivators to be assembled together for different applications; and providing easy manufacture, handling, and maintenance through modular construction with a resulting relative low cost.

While the above description contains many specifications, these should not construed as limitations on the scope of the invention, but merely as an exemplification of one preferred embodiment thereof. Many other variations are possible. For example, the base and partitions can have different shapes; the partitions on the oppositely directed faces of the base can be asymmetrical in relation to each other; the cutouts can have different shapes, such as square, oval, rectangular, etc.; the base can be without cutouts; the container opening can be provided by other means; the aquatic cultivator can be positioned on the tether using other means; etc.

Accordingly, the scope of the invention should be determined not by the embodiment(s) illustrated, but by the appended claims and their legal equivalents.

I claim:

1. A cultivating device for aquatic life, requiring broad surfaces for attachment during growth, said cultivating device comprising:

(a) a base having broad oppositely directed faces, and (b) a hub centrally positioned and extending outwardly from said base, said hub defining opposing ends comprising coupling means for connecting one said cultivating device to another said cultivating device, said coupling means comprising at one of said ends a socket, and at the other of said ends a post, said post being of sufficient size and shape to be mortise-and-tenon-like inserted in said socket, whereby said post of one said cultivating device can be connected to said socket of another said cultivating device, and (c) a plurality of partitions, having broad oppositely directed faces, extending radially from said hub and outwardly from said base, whereby substantially broad surfaces are provided for attachment purposes.

2. The cultivating device of claim 1, further including a bore extending axially through the entire length of said hub, said bore having a predetermined diameter to allow a tethering means to pass through said bore.

3. The cultivating device of claim 1, wherein said base, said hub, and said partitions are formed integrally of synthetic material.

4. The cultivating device of claim 1, wherein said partitions are symmetrically arranged about said hub.

\* \* \* \* \*